United States Patent [19]

Aranda et al.

[11] Patent Number: 5,202,671
[45] Date of Patent: Apr. 13, 1993

[54] PICK FUNCTION IMPLEMENTATION IN A PARALLEL PROCESSING SYSTEM

[75] Inventors: Michael A. Aranda, Saugerties, N.Y.; Yoshio Iida, Yokohama; Akishi Kamel, Tokyo, both of Japan

[73] Assignee: International Business Machines Corporation, Armonk, N.Y.

[21] Appl. No.: 777,477

[22] Filed: Oct. 17, 1991

Related U.S. Application Data

[63] Continuation of Ser. No. 426,143, Oct. 24, 1989, abandoned.

[51] Int. Cl.$^5$ .............................................. G09G 1/14
[52] U.S. Cl. .................................... 340/747; 340/724; 395/157
[58] Field of Search ............... 340/747, 724, 723, 722, 340/721, 706, 709; 364/518; 395/134, 157

[56] References Cited

U.S. PATENT DOCUMENTS

| | | | |
|---|---|---|---|
| 4,451,895 | 5/1984 | Sliwkowski | 364/521 |
| 4,710,761 | 12/1987 | Kapur et al. | 340/723 |
| 4,788,538 | 11/1988 | Klein et al. | 340/747 |
| 4,816,814 | 3/1989 | Lumelsky | 340/723 |
| 4,849,907 | 7/1989 | Aotsu et al. | 364/518 |
| 4,943,801 | 7/1990 | Oguchi | 340/747 |
| 5,012,433 | 4/1991 | Callahan et al. | 364/518 |

FOREIGN PATENT DOCUMENTS

0314289 5/1989 European Pat. Off. .

OTHER PUBLICATIONS

IBM Technical Disclosure Bulletin, vol. 29, No. 1, "Hardware Clipping Comparator", Jun. 1986, pp. 158–161.

Primary Examiner—Alvin E. Oberley
Assistant Examiner—Xiao M. Wu
Attorney, Agent, or Firm—Mark S. Walker; William A. Kinnaman

[57] ABSTRACT

A processing system for identifying operator selection of a graphics object in a system using parallel pixel generation. Parallel pixel generation results in a fragment comprising a series of M pixels being generated at each processing cycle. The image fragment must be tested against an operator defined selection area to determine whether the object being generated falls within the operator selection area. Fragments are initially classified as totally within or totally outside of the area. If a fragment intersects the operator selection area, mask is applied for each boundary of the operator defined area. Selection is signalled based upon the logical combination of the masked image fragments. Operator selection or picking occurs without the overhead of maintaining a pick RAM for the X and Y dimensions.

20 Claims, 6 Drawing Sheets

FIG.11

PICK FUNCTION IMPLEMENTATION IN A PARALLEL PROCESSING SYSTEM

CROSS-REFERENCE TO RELATED APPLICATION

This application is a continuation of application Ser. No. 07/426,143, filed Oct. 24, 1989, now abandoned.

BACKGROUND

1. Field of Invention

The present invention relates to graphics display systems and more particularly to graphics display systems that employ parallel processing. The invention relates to the process for identifying or picking a displayed object from a graphics display for further processing, and in particular, to the process for identifying the selected object during parallel generation of a display image.

2. Description of Related Art

The problem of graphics object selection, or picking, is well known in the art of graphics display systems. Graphics display systems are used in computer-aided design (CAD) to represent mechanical drawings and resulting manufactured objects. Graphics display systems may also be employed for simulation purposes, including the use in aircraft, automobile, and military vehicle pilot or driver training devices. The operator of a CAD system or developer of a simulator environment must provide the graphics instructions necessary to generate the required object on the graphics display screen. Displayed objects are then available for manipulation, modification, and deletion. The operator must have some method for communicating to the display system which of the displayed objects is being selected for manipulation.

Prior art systems provide several methods for communicating between the operator and the graphics display system. For example, Foley and Van Dam in *Fundamentals of Interactive Computer Graphics*, Addison-Wesley Publishing Co., 1982, pp. 165–168, describe a pick identification process where a display processing unit (DPU) detects a light pen selection of the graphics object and communicates the name of a segment being drawn to the graphics controller. Foley and Van Dam also describe other pick schemes in the referenced material.

U.S. application Ser. No. 07/043,019, now U.S. Pat. No. 4,847,605, filed Apr. 27, 1987 entitled "Picking in a Graphics System", commonly assigned, describes the coordination between a picking window and the display generator. U.S. Pat. No. 4,451,895 to Sliwkowski, describes the process of picking and address correlation in a graphics display system. Each of these references describes a means and method for detecting which segment of a graphics object is referenced during an operator initiated pick request. Each of the references provides a means for comparing the location of the pick window or pick selection point to the graphics object. In each of these cases it is assumed that the graphics object is being generated one point at a time. The picking function in the above references either tests each individual point as it is generated, or compares the address of the pick window to the addresses of the segments in display memory. None of these references address the problem of picking in a parallel processing environment where a number of pixels may be generated for display in parallel. The present invention is directed to solving the pick problem in the parallel processing environment.

SUMMARY OF THE INVENTION

The present invention is directed to apparatus and methods for detecting the operator selection of a graphics object (picking) in a graphics display system. In particular, it is directed to picking in a graphics display system that employs parallel processing to generate multiple pixels on the graphics display during a single processing cycle. The invention relates to a graphics display system where picking occurs during the vector generation process.

It is therefore an object of the present invention to detect the operator selection or picking of an object in a graphics system employing parallel pixel generation.

It is a further object of the invention to provide pick detection apparatus which can detect picking without adding overhead to the graphics processor.

It is yet another object of the present invention to provide a method of picking that operates accurately and results in a low pick error rate.

Another object of the invention is to implement pick selection without using random access memory for intermediate storage, and without the need for adding additional random access memory to the system.

These and other objects of the invention will be discussed in greater detail in the following detailed description.

DESCRIPTION OF THE PREFERRED EMBODIMENT

Graphics Processing System

Figure 1:
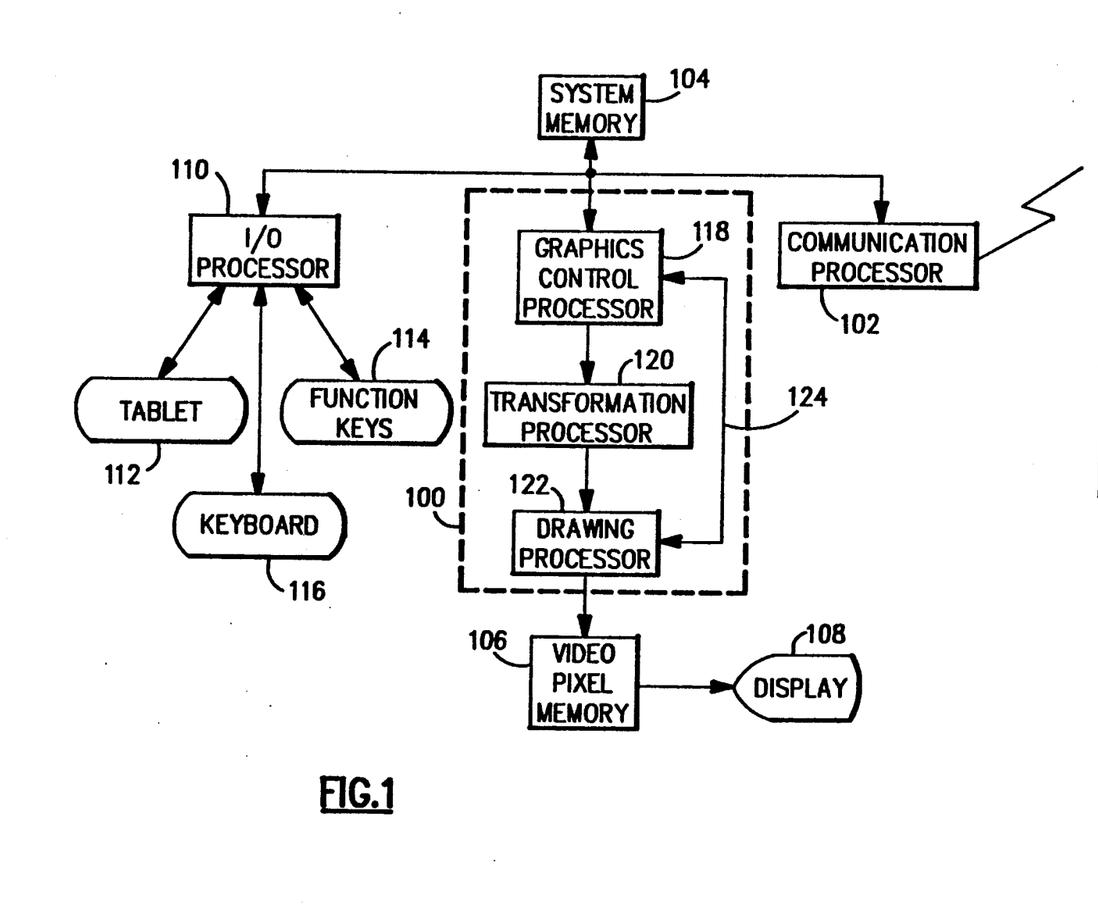
FIG. 1 is a block diagram illustrating a graphics display system of the type employing the present invention.

A graphics processing system is shown in FIG. 1. The graphics display system has a display processor 100 that is used to perform the processing necessary to create an image for display.

Communications processor 102 is optionally attached to a remote processor for transferring data and graphics orders to the display processor. Graphics orders and graphics data are stored in system memory 104.

Display processor 100 accesses the display processing orders in system memory 104 and generates an output image for video pixel memory 106. The image from video pixel memory 106 is used to generate an output image on a raster scan display device such as display terminal 108. Display output could also be generated for printers or plotters that accept a raster scanned image.

Input/Output processor 110 is provided to control the interaction between the graphics display system and an operator. The I/O processor 110 may be attached to a variety of input or output devices such as a tablet with a stylus 112, a set of function keys 114, or a keyboard 116.

The display processor 100 is made up of several subcomponent processors. Graphics control processor 118 accesses the graphics orders and data in system memory 104 and receives I/O directives from I/O processor 110. Graphics control processor 118 generates commands to be executed by transformation processor 120 to perform transformations on a graphics object. Transformations may include scaling, rotation, or translation of an object to appear on a display device. The output from transformation processor 120 is directed to drawing processor 122 which generates the output points to be written to video pixel memory 106. Drawing processor 122 is also directly responsive to graphics control processor 118 via command line 124. Drawing processor 122 includes the pick logic necessary to detect the picking of an object in response to an operator pick request.

Figure 2:
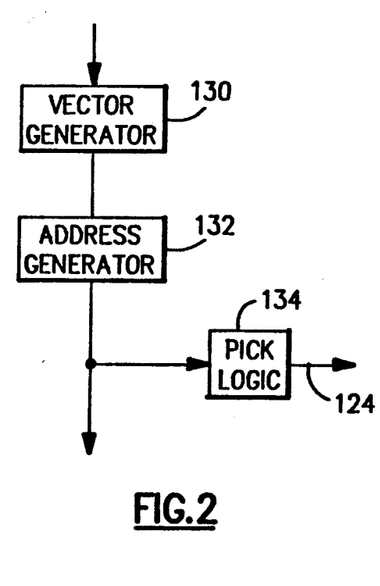
FIG. 2 is a block diagram illustrating the relationship between pick logic and the display processor logic.

Drawing processor 122 is shown in greater detail in FIG. 2. Vector generator 130 interprets the transformed graphics orders from transformation processor 120 and generates the signals necessary to draw the requested object. The signals are typically presented as increments in the X and Y direction that will result in the required final image. The incremental signals are passed to address generator 132 which generates the actual address in video pixel memory 106 to which a pixel must be written. The output of address generator 132 is directed to video pixel memory 106 and to pick logic 134. Pick logic 134, in the prior art systems, examines the addresses and detects the presence of an address within a pick window. A signal 124 is sent to the graphics control processor indicating an operator selection or pick.

Picking

Picking refers to the process of selecting a graphic object such as a line, polygon, character, or segment from the image on a display device. An operator controlled selection device, such as a cursor controlled by a tablet and stylus, mouse, cursor control keys, or a light pen, touch screen, or other device is used by the operator to communicate a location on the display device containing an object the operator wishes to process. Picking logic is necessary to translate the physical operator indication into a frame of reference that can be compared by the graphics display system. Once the display device location has been determined, the graphics display system must determine which graphics object is present at that location and then communicate that selection to the graphics control processor 118. Once selection has occurred, the operator may initiate further graphic control actions against the selected object. These actions can include modification of the object, deletion of the object, movement of the object, or a change of object attributes such as color.

Figure 3:
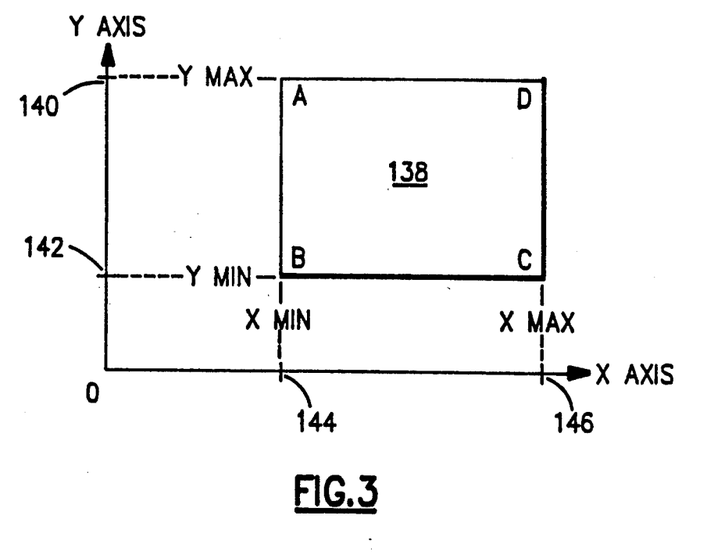
FIG. 3 is an illustration of a pick window according to the present invention.

An operator is usually unable to position a selector device precisely on a single pixel for selection. A pick window of, for example, four pixels by four pixels is typically defined which allows a pick to occur through approximate positioning of the operator controlled selection device. A pick window is shown in FIG. 3. Pick window 138 can be defined in terms of four corner points that define the X and Y axis boundaries of the area to be searched to identify the picked object. These points are Ymax 140, Ymin 142, Xmin 144, and Xmax 146.

Prior art pick selection logic relied upon the projection of the pick window onto the X and Y axes for selection of a picked object. The extent of the pick window can be represented in a pick RAM by setting the bits corresponding to the extent of the pick window to one. For example, in a display device with a $1024 \times 1024$ display format, an X pick RAM can be defined as $1 \times 1024$ and a Y pick RAM as a second $1 \times 1024$ area. For a $4 \times 4$ pick window, the extent of the pick window in each RAM can be defined by placing a 1 in the four pixel positions corresponding to the screen location of the pick window. The pick window of FIG. 3 can be projected onto the X axis extending between Xmin 144 and Xmax 146 and onto the Y axis between Ymin 142 and Ymax 140.

Figure 4:
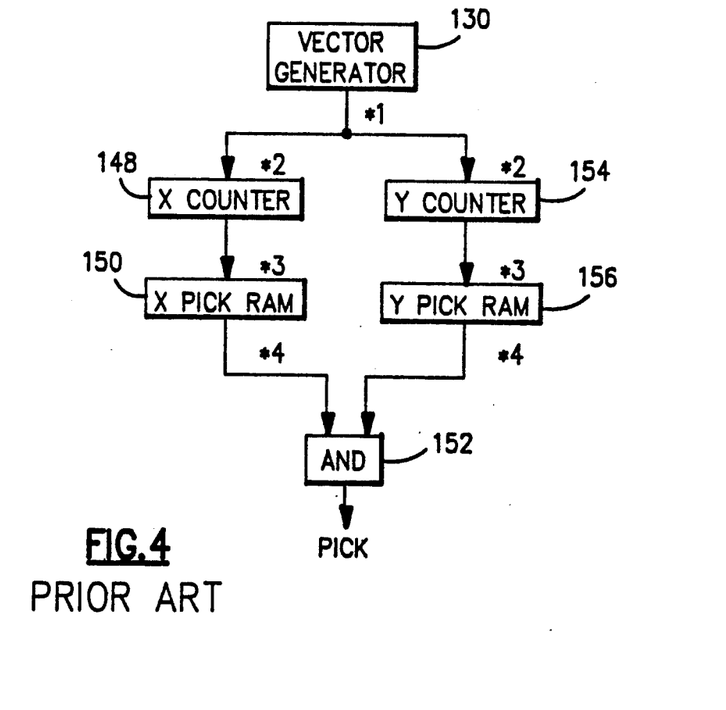
FIG. 4 is a block diagram representing a prior art pick detection logic.

A prior art pick detect circuit is shown in FIG. 4. Vector generator 130 outputs the incremental X and Y pixel drawing orders. X counter 148 is responsive to an order to increment the X address. The output of X counter 148 is used to address X pick RAM 150. The value of the bit addressed in X pick RAM is passed to AND circuit 152. Similarly Y counter 154 is incremented by a Y increment order addressing Y pick RAM 156 that passes a value to AND circuit 152. If the value in both the X pick RAM and Y pick RAM is 1 the result from AND circuit 152 is a pick signal of 1 indicating that the object lies within the pick window.

A major disadvantage of the prior art picking scheme is the need to maintain an X and Y pick RAM. As the size of the display device increases, the amount of memory that must be devoted to these RAMs also increases. Clearing and setting up pick RAMs in prior art systems requires more than one machine cycle per bit of pick RAM, e.g., a 1024 pick RAM would require more than 1024 machine cycles to clear and set up.Second, the pick detection logic of the prior art is designed to detect the pick as a single pixel is being drawn. In advanced graphics systems, parallel processing is implemented so that a number of pixels are drawn in each clock cycle. This parallel processing is required to provide increased speed for high function graphics workstations.

Parallel Pixel Generation

Parallel pixel generation involves the generation of multiple pixels to video pixel memory 106 in a single clock cycle. The set of pixels represent a fragment of the line or other object being generated by the display processor. An example of one technique for generating multiple pixels is presented in the U.S. patent application Ser. No. 07/115,451, now U.S. Pat. No. 4,878,182, filed Oct. 30, 1987 and commonly assigned. The parallel pixel generator may generate, for example, four pixels to the video pixel memory. The picking problem therefore becomes testing to determine whether any of those pixels fall within the pick window.

Figure 5:
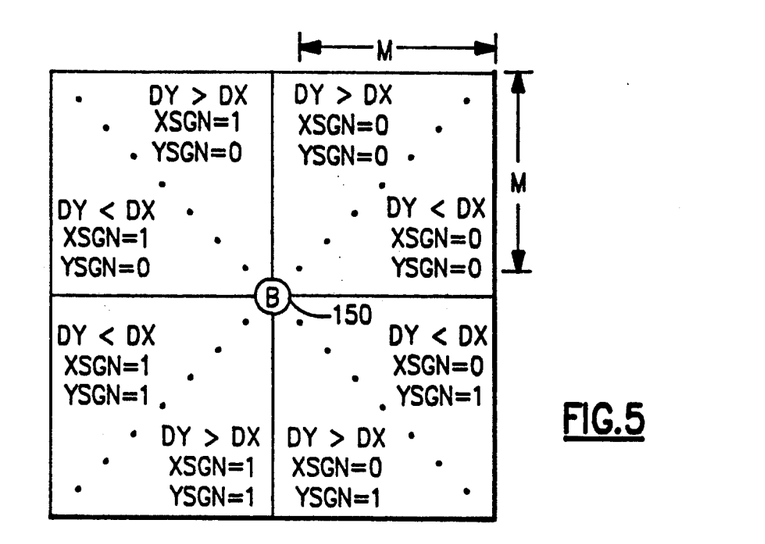
FIG. 5 is an illustration of the scope of pixel drawing in devices which employ the present invention.

A definition of terms used in the following discussion of the invention follows. The multiple pixels drawn by the parallel vector generator will be termed a "fragment". Each fragment will consist of M pixels to be drawn in the video pixel memory. Frequent orientation will be represented by a series of parameters. FIG. 5 illustrates the potential extent of a fragment originating at point b (150) from a line having a slope of DY/DX. The line fragment is expressed by a set of binary variables. The variable WPIX indicates whether the position should be written (1) or not (0). XPOS and YPOS represent the position change enable variables along the X and Y axes respectively. A 1 indicates that an increment or decrement along the axis will occur. XSGN and YSGN indicate whether an increment (0) or decrement (1) will occur. Each fragment will have a single XSGN and YSGN and M values of XPOS, YPOS, and WPIX. This output fragment will be transmitted to the video pixel memory and to pick logic 134. For example, in the situation where DY is less than DX and XSGN=0 and YSGN=0, XPOS 0-3 of 1111 and YPOS 0-3 of 1010 would result in the following fragment pattern (b indicates the beginning point for the fragment):

```
            x x
        x x
    b
```

If a fragment cannot be classified as trivially in or out, a more detailed analysis must be undertaken.

Figure 6:
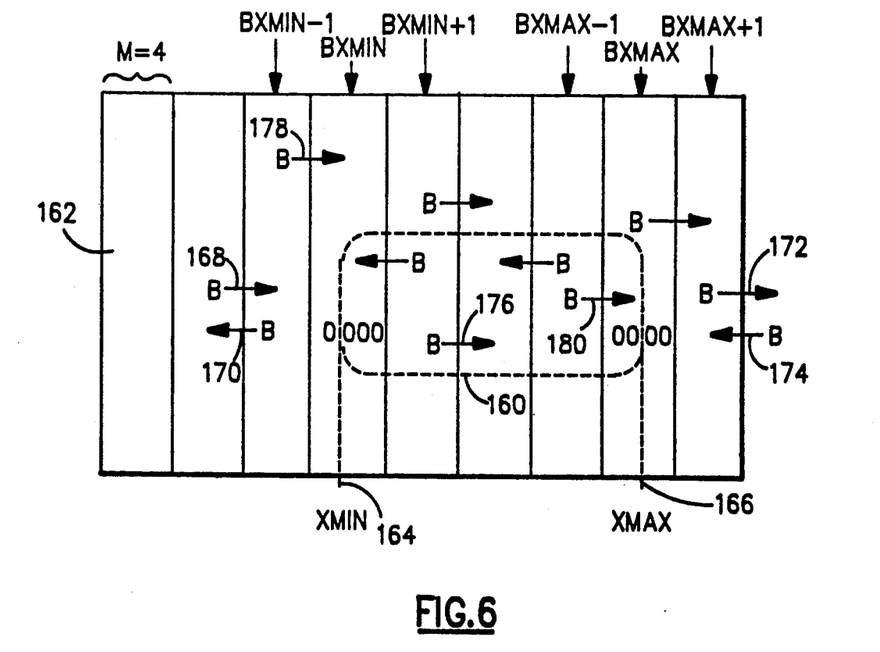
FIG. 6 is an illustration of the relationship between a pick window and line fragments and is used in discussing the preferred embodiment of the present invention.

FIG. 6 will be used to describe the concept of trivial acceptance or rejection (trivial in and trivial out). FIG. 6 illustrates a portion of a raster scan display. A pick window 160 is defined by the dotted line boundaries shown. Pick detection logic attempts to determine when a line fragment will be drawn within the pick window. This discussion will consider projection and analysis along the X axis; an analysis of Y axis projection is equivalent. The screen segment is divided up into a number of blocks, for example 162, each having a width of M pixels. In one embodiment M=4 and the screen area is logically divided into four pixel blocks. The boundaries of the pick window 160 are projected onto the X axis at points Xmin (164) and Xmax (166). The block containing Xmin can then be labeled BXmin with the blocks on either side labeled BXmin-31 1 and BXmin+1 respectively. Similarly the blocks BXmax, BXmax−1, and BXmax+1 are labeled. These designations are used to analyze the line fragment to determine whether it should be trivially accepted or trivially rejected.

Each line fragment represents M pixels. Thus, each line fragment will be either totally within one block or crossing at most one block boundary. Line fragments are shown in FIG. 6 based on the beginning point, b, and an arrow representing direction of the line fragment. A line fragment beginning in a block less than BXmin−1 and proceeding in a positive direction, for example fragment 168, will never intersect the pick window and therefore can be trivially designated as outside the pick window. No further analysis is required. Similarly line 170, drawn in the negative X direction will not intersect the BXmin and therefore can be designated as trivially outside the pick window. A similar analysis applies to Xmax as shown by the example lines 172 and 174.

A segment beginning at a block greater than BXmin and less than BXmax−1, for example, fragment 176, can be designated as a "trivial in" in the X dimension. Where trivial in (X) AND trivial in (Y) is true the fragment is classified as "trivial in" and requires no further analysis. Where trivial out (X) OR trivial out (Y) is true, the fragment is designated "trivial out".

The process of detecting trivial in and trivial out fragments reduces the amount of analysis required for each fragment. As a result of eliminating those fragments totally outside or totally within the window, the analysis may be focused on those segments which potentially intersect the boundaries of the projected pick window, for example segments 178, 180 in the figure.

Figure 7:
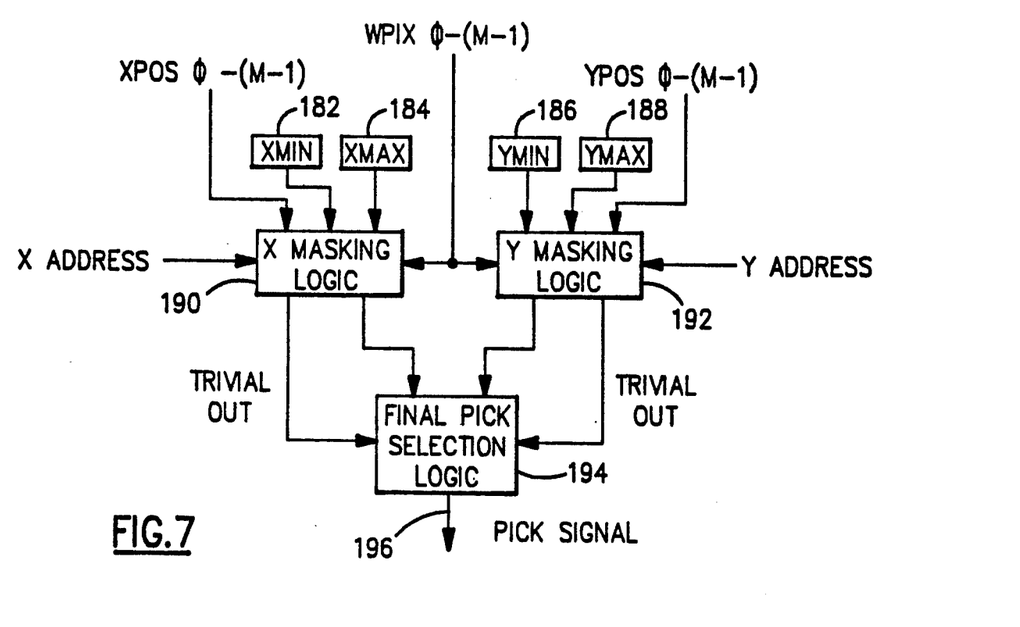
FIG. 7 is a block diagram of pick logic according to the present invention.

A block diagram showing the overall structure of pick logic according to the present invention is shown in FIG. 7. The preferred embodiment of the present invention is constructed using gate array logic to implement the logic functions specified. It will be clear to those practitioners in the field that alternate implementations of this logic are possible. For example, the process could be implemented totally in software, through without the added processing speed advantages of the hardware implementation.

Implementation of the preferred embodiment using gate arrays has the advantage of reducing the number of processing cycles required to detect a picking action. Prior art devices employing static random access memory (SRAM) required a large number of cycles to update the pick RAM. In a typical 16×16 pixel window, 32 clock cycles are required to update the pick RAM. In the present invention only four registers must be updated, the Xmin, Xmax, Ymin, and Ymax registers requiring only four cycles. In addition, the preferred embodiment of the present invention is implemented using a pipelined architecture so that a pick output is generated during each processing clock cycle.

FIG. 7 illustrates the detail of pick logic 134 shown in FIG. 2. The boundaries of the pick window are loaded into registers 182, 184, 186 and 188 representing Xmin, Xmax, Ymin and Ymax respectively. The Xmin, Ymin, Xmax, and Ymax registers are loaded by the processing unit when a command to update the pick window value is received from the pick device. The number of signals from the min or max registers are nx which represents the number of bits required to address a point on the display along the X axis, and ny (number of bits required to address a point on the display device along the Y axis) for X and Y respectively. The vector generator and address generator provide the other input values required by the pick logic. As discussed above, vector generator provides the values of XPOS0—(M−1), YPOS0—(M−1) and WPIX0—(M−1). An address generator provides the X address and Y address for beginning point b. The address generator generates and keeps the address of the reference point of fragments and is loaded by the processor when a line is first started. Then the address is incremented by 0, 1, 2, . . . or m, according to the number of valid outputs from the parallel vector generator. Pick logic according to the present invention is divided into X masking logic 190 and Y masking logic 192. Each of these logic sections is identical serving to mask the WPIX values based upon the respective min and max boundaries, the position values and the address. Outputs of the X masking logic and Y masking logic are compared in final pick selection logic 194 leading to the generation of pick signal 196. Trivial in selection occurs within the X and Y masking logic sections 190, 192 while trivial out selection occurs in the final pick selection logic 194.

Figure 8:
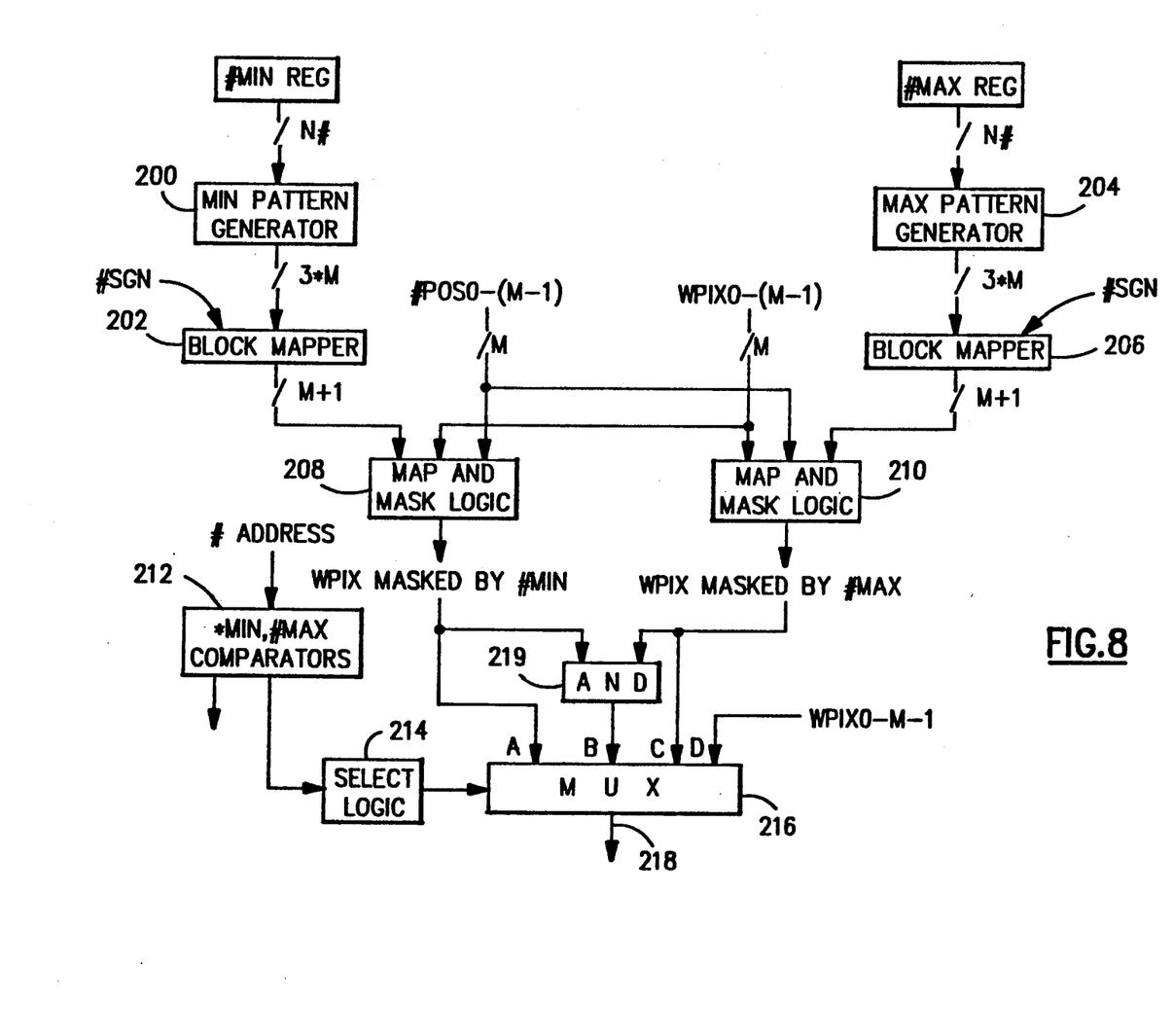
FIG. 8 is a block diagram of the masking logic employed by the present invention.

A detailed block diagram of X masking logic 190 and equivalent Y masking logic 192 is shown in FIG. 8. Min pattern generator 200 and associated block mapper 202 are used to generate the pattern used to mask WPIX based upon the Xmin or Ymin values. Similarly max pattern generator 204 and associated block mapper 206 are used to generate the max pattern for masking. Map and mask logic 208 performs the masking based on the min value while logic 210 performs masking based on the max value. Min and max comparators 212 compare the address value provided to generate trivial in and trivial out signals which drive select logic 214 (for trivial in) which in turn performs selection by a multiplexer 216. A trivial in case causes WPIX0—(M−1), (input d) to be passed unchanged to output 218.

Min pattern generator 200 generates a bit pattern encompassing the minimum limit of the pick window, Xmin. The generated pattern is 3*M bits long and spans the defined blocks BXmin−1, BXmin, and BXmin+1. Thus, in the preferred embodiment where M=4, a pattern of 12 bits will be generated. Bits less than Xmin are 0 while bits greater than or equal to Xmin are 1.

Block mapper 202 first tests the XSGN or YSGN value to determine whether the fragment is being drawn in a positive or negative direction. If the SGN value indicates negative drawing direction, then the order of the bits in the pattern is inverted (e.g. pattern 0000 0001 1111 becomes pattern 1111 1000 0000). Finally, block mapper selects M+1 bits which correspond to the position of the fragment located at pixels b, 0, 1, ... M−1. The output of the block mapper is a mask of M+1 pixels that will be used to map M+1 WPIX pixels in the map mask logic 208. The pattern selection logic employed in the block mapper 202 and 206 consists of a series of M+1 multiplexers which select M+1 points from the 3*M points of the generated pattern. If the SGN value indicates positive drawing direction, then the selection is based upon the least significant "bm" address bits; otherwise, the selection is based upon the INVERSE of the least significant "bm" address bits. (bm is the number of bits required to represent M, the length of the segment. In the preferred embodiment bm=2.)

Max pattern generator 204 and block mapper 206 operate similarly to the min pattern generator. Max pattern generator 204 generates 3*M pixels bounding Xmax or Ymax with positions less than or equal to max being set to 1 while positions greater than max are set to 0. Block mapper 206 performs a similar inversion based upon SGN and provides M+1 mask pixels to map and mask logic 210.

Map and mask logic 208 and 210 are similarly constructed. Position signals 0 through M−1, WPIX0 through M−1 and the output of the block mapper (B, 0, 1, ... (m−1)) are used as inputs. The output of the map and mask logic is WPIXm—MASKED WPIX. The following truth table describes the logic: (please note: the logic applies to Xmin, Xmax, Ymin and Ymax. # represents X or Y. & represents the Boolean function AND.)

| #pos(0...3) | WPIXm0 | WPIXm1 | WPIXm2 | WPIXm3 |
|---|---|---|---|---|
| 0000 | WPIX0 & B | WPIX1 & B | WPIX2 & B | WPIX3 & B |
| 0001 | WPIX0 & B | WPIX1 & B | WPIX2 & B | WPIX3 & B |
| 0010 | WPIX0 & B | WPIX1 & B | WPIX2 & B | WPIX3 & 0 |
| 0011 | WPIX0 & B | WPIX1 & B | WPIX2 & B | WPIX3 & 0 |
| 0100 | WPIX0 & B | WPIX1 & B | WPIX2 & 0 | WPIX3 & 0 |
| 0101 | WPIX0 & B | WPIX1 & B | WPIX2 & 0 | WPIX3 & 0 |
| 0110 | WPIX0 & B | WPIX1 & B | WPIX2 & 0 | WPIX3 & 1 |
| 0111 | WPIX0 & B | WPIX1 & B | WPIX2 & 0 | WPIX3 & 1 |
| 1000 | WPIX0 & B | WPIX1 & 0 | WPIX2 & 0 | WPIX3 & 0 |
| 1001 | WPIX0 & B | WPIX1 & 0 | WPIX2 & 0 | WPIX3 & 0 |
| 1010 | WPIX0 & B | WPIX1 & 0 | WPIX2 & 0 | WPIX3 & 1 |
| 1011 | WPIX0 & B | WPIX1 & 0 | WPIX2 & 0 | WPIX3 & 1 |
| 1100 | WPIX0 & B | WPIX1 & 0 | WPIX2 & 1 | WPIX3 & 1 |
| 1101 | WPIX0 & B | WPIX1 & 0 | WPIX2 & 1 | WPIX3 & 1 |
| 1110 | WPIX0 & B | WPIX1 & 0 | WPIX2 & 1 | WPIX3 & 2 |
| 1111 | WPIX0 & B | WPIX1 & 0 | WPIX2 & 1 | WPIX3 & 2 |

Figure 9:
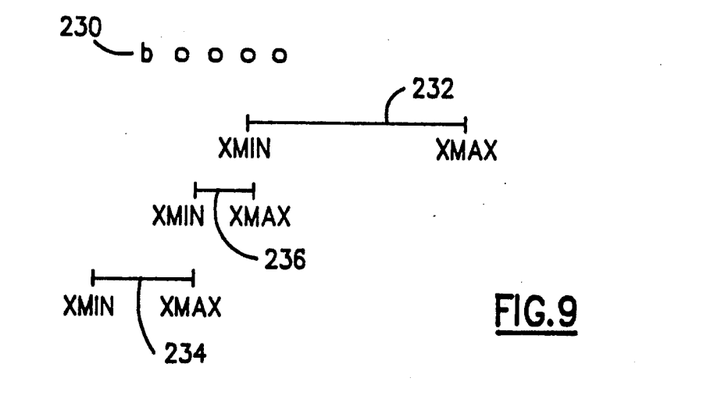
FIG. 9 is an illustration of the relationship between pick window projections and line fragments.

Multiplexer 216 selects the mask WPIX output 218 to be passed to final selection logic 194. The multiplexer must consider four cases. The first case is the trivial in selection where detailed analysis of the fragment location is not required. Trivial in selection results in the values of WPIX0-(M−1) being passed to output 218 unchanged. The other three conditions depend upon the relation of Xmin and Xmax to the fragment. A fragment 230 is shown in FIG. 9. In the first case a pick window extent 232 along the X axis is shown between Xmin and Xmax. In this case only Xmin divides fragment 230 and therefore WPIX masked by min is passed to WPIX output 218. In the second case, Xmin and Xmax 234, only Xmax divides fragment 230 and the values of WPIX masked by max are passed to WPIX 218. Finally in the condition shown by segment 236, both Xmin and Xmax divide fragment 230. In this case AND logic 219 is employed to combine the masked WPIX values and the resulting combined value passed to WPIX value 218.

Figure 10:
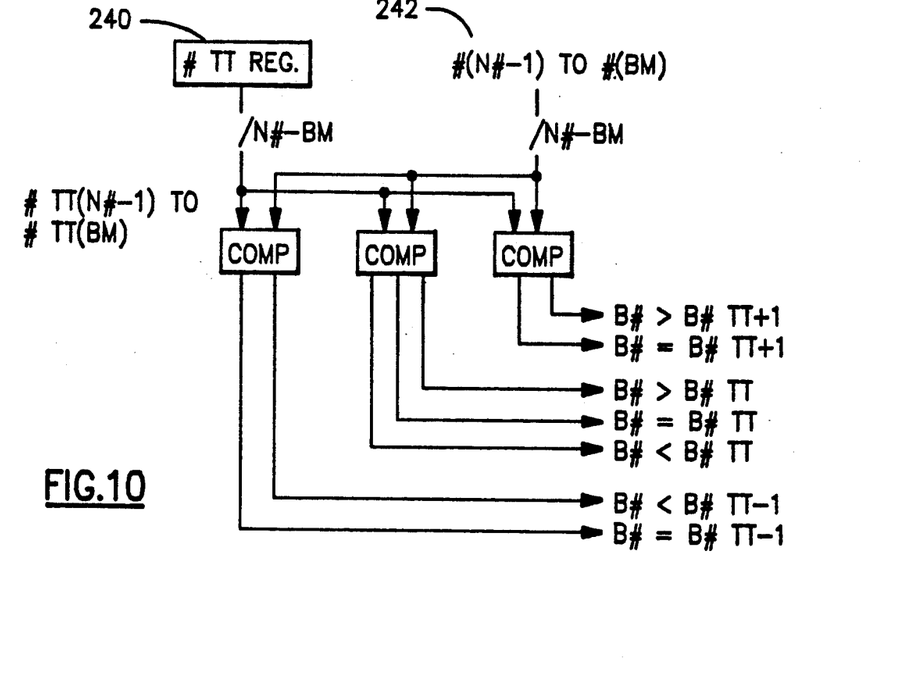
FIG. 10 is a block diagram of the block address comparator logic.

Select logic 214 that controls the multiplexer is driven by min and max comparators 212. FIG. 10 illustrates the comparator logic employed. A total of four comparators would exist, one each for Xmin, Xmax, Ymin, and Ymax. In the figure, # represents X or Y, and TT represents min or max. The comparators compare the register value 240, e.g. Xmin, to the address 242 and generates bit signals indicating the results of the comparison. The output signal indicates the relative position of the block containing the address (b#, e.g. bX) to the min or max blocks, (b#TT+1, e.g. bXmin+1) and is used by selector logic 214 to generate the trivial in selection signal or the trivial out selection signal.

The logic to generate the signal is based upon the following defined terms where # represents X or Y.

| | |
|---|---|
| #min+ = | (b#=b#min) or (b#=b#min−1) |
| #max+ = | (b#=b#max) or (b#=b#max−1) |
| #min− = | (b#=b#min) or (b#=b#min+1) |
| #max− = | (b#=b#max) or (b#=b#max+1) |
| trivin+# = | (b# > b#min) and (b# < b#max−1) |
| trivin−# = | (b# > b#min+1) and (b# < b#max) |

Selection logic 214 uses the following logic table to generate a selection signal to multiplexer 216. Select values shown in the table correspond to multiplexer 216 input line labels.

| #sgn | 0 | 1 | 0 | 1 | 0 | 1 | 0 | 1 | h: don't care |
|---|---|---|---|---|---|---|---|---|---|
| #min+ | 1 | h | 0 | h | 1 | h | h | h | |
| #max+ | 0 | h | 1 | h | 1 | h | h | h | |
| #min− | h | 1 | h | 0 | h | 1 | h | h | |
| #max− | h | 0 | h | 1 | h | 1 | h | h | |
| trivin+# | 0 | h | 0 | h | 0 | h | 1 | h | |
| trivin−# | h | 0 | h | 0 | h | 0 | h | 1 | |

| -continued | | | | | | | |
|---|---|---|---|---|---|---|---|
| Select | a | a | c | b | b | d | d |

Finally, trivial out values determined from the comparators according to the following logic equation.

| trivout = | (bx < bxmin−1) or (bx > bmax) |
|---|---|
| | or (bx < bxmin) or (bx > bxmax+1) |
| | or (by < bymin−1) or (by > bymax) |
| | or (bx < bymin) or (bx > bymax+1) |

When trivial out is 1, a pick signal 196 of 0 (no pick) is generated by final pick selection logic 194 regardless of the result of the masking operations.

Figure 11:
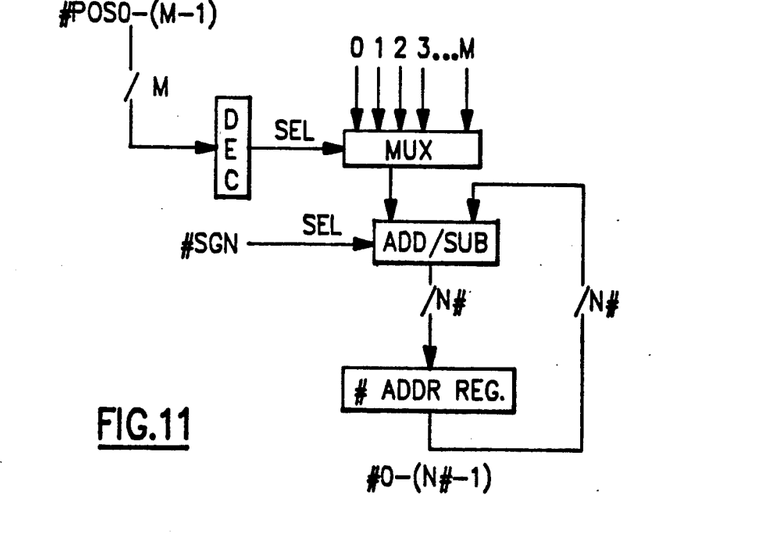
FIG. 11 is a block diagram of the address generation logic employed in the present invention.

FIG. 11 shows additional detail for address generation logic 132. Address generators are provided for both X and Y addresses and are controlled by position movement values XPOS or YPOS. The address counters are incremented according to the number of 1 values in #POS0-(M−1).

Through the above invention has been described for use in a picking environment, similar structure and apparatus can be used to provide scissoring, that is, the ability to display only the area inside a large defined window. The scissored window would be represented as the pick window. Pick function selection logic 194 would be modified for scissoring so that WPIX0-(M−1) is output based upon logical ANDing of the outputs from X masking logic and Y masking logic 190 and 192. This final WPIX output would replace the single binary valued pick signal 196 generated in the present embodiment.

The present invention has been described in terms of two-dimensional picking. However, the techniques described and the apparatus employed in the above description can be extended to allow three-dimensional picking. The logic provided for X and Y axes can be replicated to include a Z axis analysis with the necessary additional logic for combining the results from that extra axis.

We claim:

1. In a graphics system in which a predetermined number of pixels representing a fragment of a two-dimensional pixel image are generated in parallel for display by a raster scan device, a method of detecting the generation of pixels within a defined window having a boundary extending along a first dimension of said image, said method comprising the steps of:
    (a) (1) generating a mask fragment comprising mask bits corresponding to contiguous pixels distributed along a portion of a second dimension of said image perpendicular to said first dimension on either side of said boundary, each of said mask bits indicating the side of said boundary on which the corresponding pixel lies;
    (2) masking said image fragment with said mask fragment to produce a masked image fragment; and
    (b) (1) partitioning said image into contiguous blocks distributed along said second dimension of said image, each of said blocks having a predetermined extent in said second dimension;
    (2) associating said image fragment with one of said blocks in accordance with the position of said fragment in said image;
    (3) trivially determining the location of said image fragment relative to said window in accordance with the position of said block relative to said window;
    (c) logically combining said masked image fragment with said trivial determination of the location of said image fragment to generate a detection signal indicating the presence of an image fragment within said window.

2. A method as in claim 1 in which a single detection signal is generated indicating the presence of at least one pixel of said image fragment within said window.

3. A method as in claim 1 in which separate detection signals are generated for each of the pixels of said image fragment, each detection signal indicating the presence of the corresponding pixel within said window.

4. A method as in claim 1 in which said image fragment has a starting point corresponding to one of the pixels of said image, said image fragment being associated with the block containing said starting point.

5. A method as in claim 4 in which said image fragment has a direction along said second dimension relative to said starting point, said location being trivially determined in accordance with the position of said block and said direction.

6. A method as in claim 1 in which said mask frabment is a first mask fragment representing a first boundary of said window, said first mask fragment masking said image fragment to produce a first masked image fragment, said method including the further steps of:
    (a) (3) defining a second boundary of said window such that pixels on one side of said second boundary are within said window while pixels on the other side of said second boundary are outside said window;
    (4) masking said image fragment with a second mask fragment representing said second boundary to produce a second masked image fragment; and
    (5) logically combining said first and second masked image fragments to form a combined masked image fragment.

7. A method as in claim 6 in which said first and second masked image segments are logically ANDed.

8. A method as in claim 6 in which said step (b) (3) includes the step of determining whether said image fragment is trivially within said first and second boundaries, said step (c) including the steps of:
    (c) (1) if said image fragment is trivially within only one of said boundaries, selecting the masked image fragment corresponding to the other of said boundaries; and
    (2) if said image fragment is trivially within neither of said boundaries, selecting the combined masked image fragment.

9. A method as in claim 1 in which said step (a) (1) of generating a mask fragment comprises the steps of:
    (A) generating a set of mask bits corresponding to pixels extending along said second dimension in said one block with which said image fragment is associated and at least one adjacent block; and
    (B) generating said mask fragment from a subset of said mask bits determined in accordance with the pixel position of said image fragment relative to said blocks.

10. A method as in claim 1 in which said predetermined extent of each block corresponds to said predetermined number of pixels in said fragment.

11. In a graphics system in which a predetermined number of pixels representing a fragment of a two-dimensional pixel image are generated in parallel for display by a raster scan device, apparatus for detecting the generation of pixels within a defined window having a boundary extending along a first dimension of said image, said apparatus comprising:

(a) (1) means for generating a mask fragment comprising mask bits corresponding to contiguous pixels distributed along a portion of a second dimension of said image perpendicular to said first dimension on either side of said boundary, each of said mask bits indicating the side of said boundary on which the corresponding pixel lies;

(2) means for masking said image fragment with said mask fragment to produce a masked image fragment; and (b) (1) means for partitioning said image into contiguous blocks distributed along said second dimension, each of said blocks having a predetermined extent in said second dimension;

(2) means for associating said image fragment with one of said blocks in accordance with the position of said fragment in said image;

(3) means for trivially determining the location of said image fragment relative to said window in accordance with the position of said block relative to said window;

(c) means for logically combining said masked image fragment with said trivial determination of the location of said image fragment to generate a detection signal indicating the presence of an image fragment within said window.

12. Apparatus as in claim 11 in which a single detection signal is generated indicating the presence of at least one pixel of said image fragment within said window.

13. Apparatus as in claim 11 in which separate detection signals are generated for each of the pixels of said image fragment, each detection signal indicating the presence of the corresponding pixel within said window.

14. Apparatus as in claim 11 in which said image fragment has a starting point corresponding to one of the pixels of said image, said image fragment being associated with the block containing said starting point.

15. Apparatus as in claim 14 in which said image fragment has a direction along said second dimension relative to said starting point, said location being trivially determined in accordance with the position of said block and said direction.

16. Apparatus as in claim 11 in which said mask fragment is a first mask fragment representing a first boundary of said window, said first mask fragment masking said image fragment to produce a first masked image fragment, said apparatus further comprising:

(a) (3) means for defining a second boundary of said window such that pixels on one side of said second boundary are within said window while pixels on the other side of said second boundary are outside said window;

(4) means for masking said image fragment with a second mask fragment representing said second boundary to produce a second masked image fragment; and (5) means for logically combining said first and second masked image fragments to form a combined masked image fragment.

17. Apparatus as in claim 16 in which said first and second masked image segments are logically ANDed.

18. Apparatus as in claim 16 in which said means (b) (3) comprises means for determining whether said image fragment is trivially within said first and second boundaries, said means (c) comprising:

(c) (1) means responsive to the determination that said image fragment is trivially within only one of said boundaries for selecting the masked image fragment corresponding to the other of said boundaries; and (2) means responsive to the determination that said image fragment is trivially within neither of said boundaries for selecting the combined masked image fragment.

19. Apparatus as in claim 11 in which said means (a)(1) for generating a mask fragment comprises:

(A) means for generating a set of mask bits corresponding to pixels extending along said second dimension in said one block with which said image fragment is associated and at least one adjacent block; and (B) means for generating said mask fragment from a subset of said mask bits determined in accordance with the pixel position of said image fragment relative to said blocks.

20. Apparatus as in claim 11 in which said predetermined extent of each block corresponds to said predetermined number of pixels in said fragment.

* * * * *